(12) United States Patent
Baumann et al.

(10) Patent No.: US 8,102,076 B2
(45) Date of Patent: Jan. 24, 2012

(54) DAYCAB AUXILIARY POWER CONVERSION APPARATUS

(75) Inventors: Paul Baumann, Homer Glen, IL (US); Bruce Wingen, Denver, CO (US)

(73) Assignee: Enertek Solutions, Inc., Portland, OR (US)

( * ) Notice: Subject to any disclaimer, the term of this patent is extended or adjusted under 35 U.S.C. 154(b) by 0 days.

(21) Appl. No.: 12/319,214

(22) Filed: Dec. 31, 2008

(65) Prior Publication Data

US 2010/0026091 A9 Feb. 4, 2010

Related U.S. Application Data (63) Continuation-in-part of application No. 12/148,007, filed on Apr. 15, 2008, which is a continuation-in-part of application No. 11/999,581, filed on Dec. 5, 2007.

(60) Provisional application No. 61/009,711, filed on Dec. 31, 2007, provisional application No. 60/923,871, filed on Apr. 16, 2007, provisional application No. 60/873,062, filed on Dec. 5, 2006.

(51) Int. Cl.
*B60L 1/00* (2006.01)
*B60L 3/00* (2006.01)
*H02G 3/00* (2006.01)

(52) U.S. Cl. ......................... 307/9.1; 307/10.1

(58) Field of Classification Search ............... 307/9.1, 307/10.1; 320/104; 62/236, 244, 323.3; 165/202
See application file for complete search history.

(56) References Cited

U.S. PATENT DOCUMENTS

| 6,178,612 | B1 | 1/2001 | Gernstein | |
|---|---|---|---|---|
| 7,151,326 | B2 * | 12/2006 | Jordan | 307/22 |
| 2003/0034147 | A1 * | 2/2003 | Houck et al. | 165/42 |
| 2006/0077603 | A1 * | 4/2006 | Kim | 361/90 |
| 2007/0221370 | A1 * | 9/2007 | Allen et al. | 165/202 |

OTHER PUBLICATIONS

John C. Glennon; Trucking Glossary; 1998-2010; Crash Forensics. com; http://www.crashforensics.com/trucking glossary.cfm.
Bristol Drivers Solutions Ltd.; TruckSpeak—Glossary of Truck Jargon; 2008; http://www.creshforensics.com/trucking glossary.cfm; U.K.

\* cited by examiner

*Primary Examiner* — Jared Fureman
*Assistant Examiner* — Carlos Amaya
(74) *Attorney, Agent, or Firm* — Ater Wynne LLP (57) ABSTRACT

Auxiliary power is provided to an auxiliary heating, ventilation and air conditioning (HVAC) subsystem located compactly beneath the passenger seat of a daycab. Nickel metal hydride (NiMH) or suitably alternative battery power is inverted to drive the HVAC subsystem, and the batteries are charged from the daycab's alternator when the daycab's engine is running or from a roadside power grid when the daycab is idle.

14 Claims, 7 Drawing Sheets

DAYCAB AUXILIARY POWER CONVERSION APPARATUS

RELATED APPLICATIONS

This application is a continuation-in-part of and claims the benefit of priority from U.S. Ser. No. 12/148,007 filed 15 Apr. 2008 and entitled SINGLE- OR DUAL-INVERTER AUXILIARY POWER CONVERSION APPARATUS AND SYSTEM AND NARROW-HYSTERESIS CHARGING METHOD which claims benefit of priority to U.S. Provisional application No. 60/923,871 filed on 16 Apr. 2007 and entitled HYBRID AUXILIARY POWER CONVERSION APPARATUS AND SYSTEM and which is itself a continuation-in-part of U.S. Ser. No. 11/999,581, filed on 5 Dec. 2007 and entitled VEHICULAR OUTBOARD POWER CONVERSION APPARATUS, SYSTEM AND METHOD which claims the benefit of priority to U.S. Provisional application No. 60/873,062, filed on 5 Dec. 2006 and entitled VEHICULAR OUTBOARD POWER CONVERSION APPARATUS AND SYSTEM, and also claims benefit of priority to U.S. provisional application 61/009,711, filed on 31 Dec. 2007 and entitled DAYCAB AUXILIARY POWER SYSTEM AND METHOD, the contents of which, excepting only Ser. No. 12/148,007, are hereby incorporated herein in their entirety by this reference.

FIELD OF THE INVENTION

The invention relates generally to the field of commercial vehicles such as "daycabs". More particularly, the invention relates to providing auxiliary power to HVAC systems in such daycabs.

BACKGROUND OF THE INVENTION

This invention relates generally to the field of vehicular power conversion. More particularly, it concerns improved efficiency in the provision of auxiliary power conversion systems for marine, recreational, commercial, air and/or military crafts or vehicles.

American commercial truckers are required by recent federal regulation to pull off the highway and rest for ten hours out of every twenty-one hours on the road, e.g. eleven hours of driving must be followed by ten hours of rest. To date, truckers have pulled over and idled their truck engines during such stops, thereby to produce power sufficient to continuously or periodically operate air conditioning/heating and appliances such as refrigerators, televisions, computers, etc.

Internal combustion engines are extremely inefficient when idling. Children's asthma symptoms increase as a result of vehicle exhaust. The smallest pollutants from vehicle exhaust lodge deeply in the lungs causing lung damage, aggravating respiratory conditions such as asthma and bronchitis, increasing the risk of stroke and heart attack, leading to cancer and contributing to premature death. Vehicle exhaust is the leading source (~40-50%) of toxic air pollution in Oregon. Idling vehicles emit significant amounts of pollution, including sulfur dioxides, carbon monoxide, nitrogen oxide, and volatile particulate organic compounds leading to the formation of atmospheric carbon dioxide ($CO_2$). All known, peer-reviewed, published scientific studies agree that carbon dioxide by-products of human manufacture are a major contributor to global warming. An idling vehicle engine delivers zero miles to the gallon and thus wastes fuel, e.g. gasoline, diesel, bio-diesel or the like. Excessive idling is hard on a vehicle engine because the engine does not idle at peak operating temperature. Fuel does not undergo complete combustion, leaving spark plugs dirty, damaging cylinders and exhaust systems, and contaminating engine oil. Thus, such roadside idling to conform with the new federal safety regulations represents an inefficient and potentially damaging tax on a vehicle's engine, a waste of increasingly depleted fossil-fuel-based vehicle fuel resources worldwide, and an emission plume of air-borne toxins that harm the atmosphere and worsen an already existing global health hazard.

(A commercial trucker can drive only seventy hours in an eight day period, with a minimum of thirty-four hours of rest before restarting a fresh seventy hours. Accordingly, a typical driver idles approximately one hundred hours each week, and thus spends approximately four hundred hours per month idling. At approximately $3/gallon of diesel, this represents approximately $1200 dollars per month of wasted diesel, a precious fossil fuel commodity. The cost of running a conventional auxiliary power unit (APU) is approximately $400 dollars per month, at a cost savings (over idling the commercial truck's main internal combustion engine) of approximately $800 per month or $10,000 per year per commercial truck, based upon current fuel prices. The higher the price and scarcity of fuel, the more savings monthly, e.g. annually the trucker and/or company saves. Nevertheless, conventional APUs are relatively inefficient and costly to operate as an alternative to idling the main engine.)

Recreational vehicles (RVs), buses, houseboats, yachts, and other land or marine craft including military craft have auxiliary power needs similar to those of the commercial trucker for supplying power to such auxiliary systems as air conditioners/heaters and appliances such as refrigerators, computers, navigational or communication equipment, radios and the like. Many such appliances, e.g. televisions, require one or more relatively clean sources of alternating current (AC) power.

Refrigerated commercial trucks (so-called "refers") require an even more robust source of AC power. The power needs of such specially equipped trucks deeply tap the generator connected to the main drive system for the truck, i.e. its internal combustion engine. Conventional APUs do not supply sufficient power to meet such stringent refrigeration needs.

Finally, so-called "daycabs" having no sleepers and thus no extra cargo capacity nevertheless require auxiliary power for frequent stops made typically to load or unload cargo such as spoilable foodstuffs from or to restaurants. Such stops are relatively brief, e.g. 10-20 minutes, but are frequent, e.g. every ½-1 hour. Because of emissions and conservation laws in many jurisdictions, as well as costs, idling such daycabs to provide HVAC auxiliary power during such stops is not feasible. As a result, during such stops, the cab heats up in the summer or cools off in the winter, making for uncomfortable frequent returns by the driver to the daycab.

Accordingly, there is a need to provide clean and robust HVAC power to such auxiliary systems and appliances and at the same time to reduce the rate of consumption and pollution caused by roadside idling of land- and marine-based internal combustion engines.

DETAILED DESCRIPTION OF THE PREFERRED EMBODIMENTS

The invention in accordance with a preferred embodiment involves an auxiliary power system for a yacht or other watercraft, or for a vehicle such as a bus, RV, military vehicle such as a Bradley or Hummer, or commercial truck, all of which are referred to herein as "vehicles." Those of skill in the art will appreciate that auxiliary power in accordance with the present invention is outboard from the vehicle's main power train system. As such, the invention in accordance with one embodiment thereof taxes or burdens neither the main battery nor the main drive train (e.g. the internal combustion engine) of the vehicle.

Figure 1:
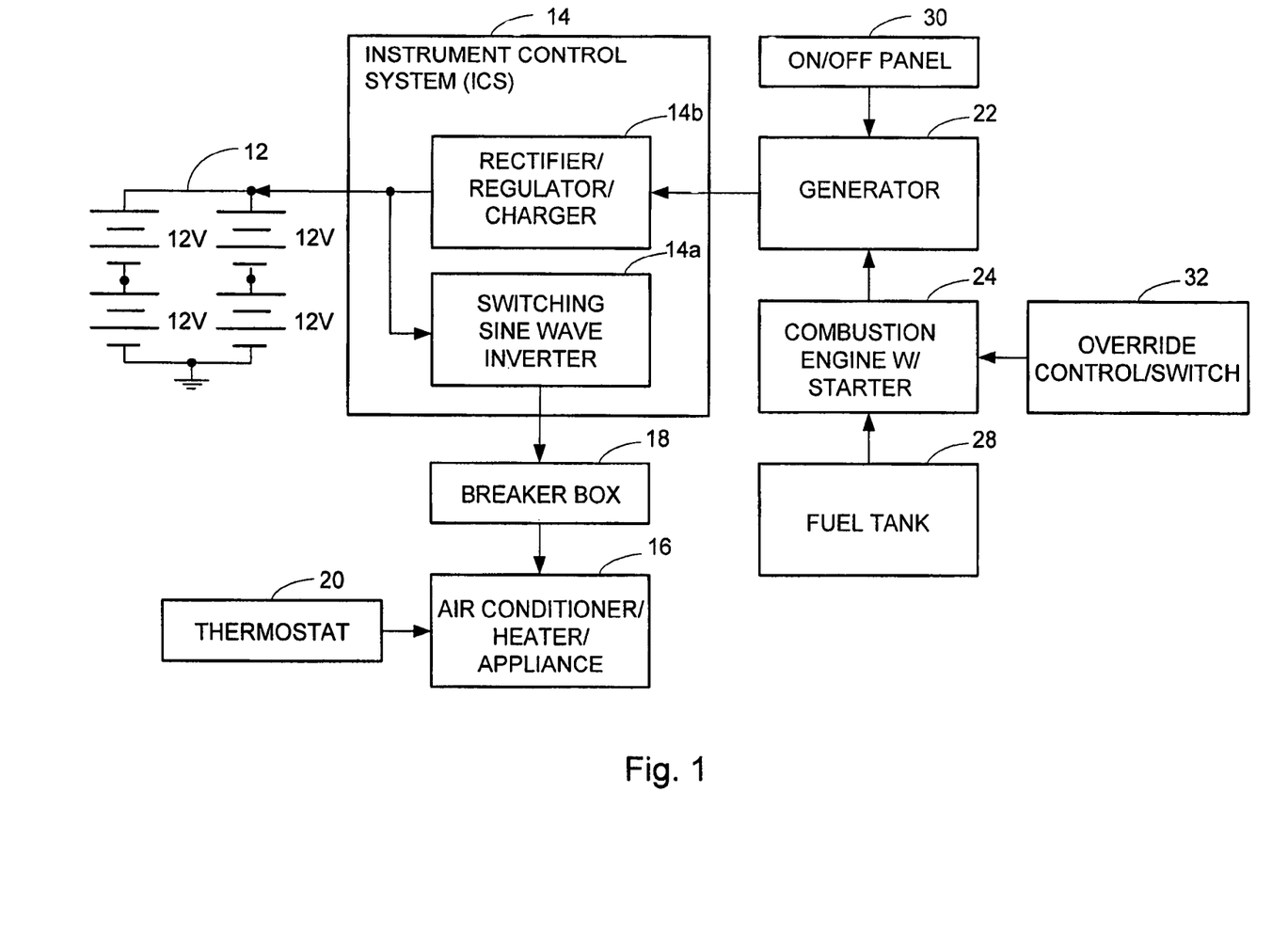
FIG. 1 is an electrical schematic block diagram of the hybrid auxiliary power conversion apparatus, in accordance with one embodiment of the invention that utilizes lead acid batteries and an instrument control system (ICS).
Figure 2:
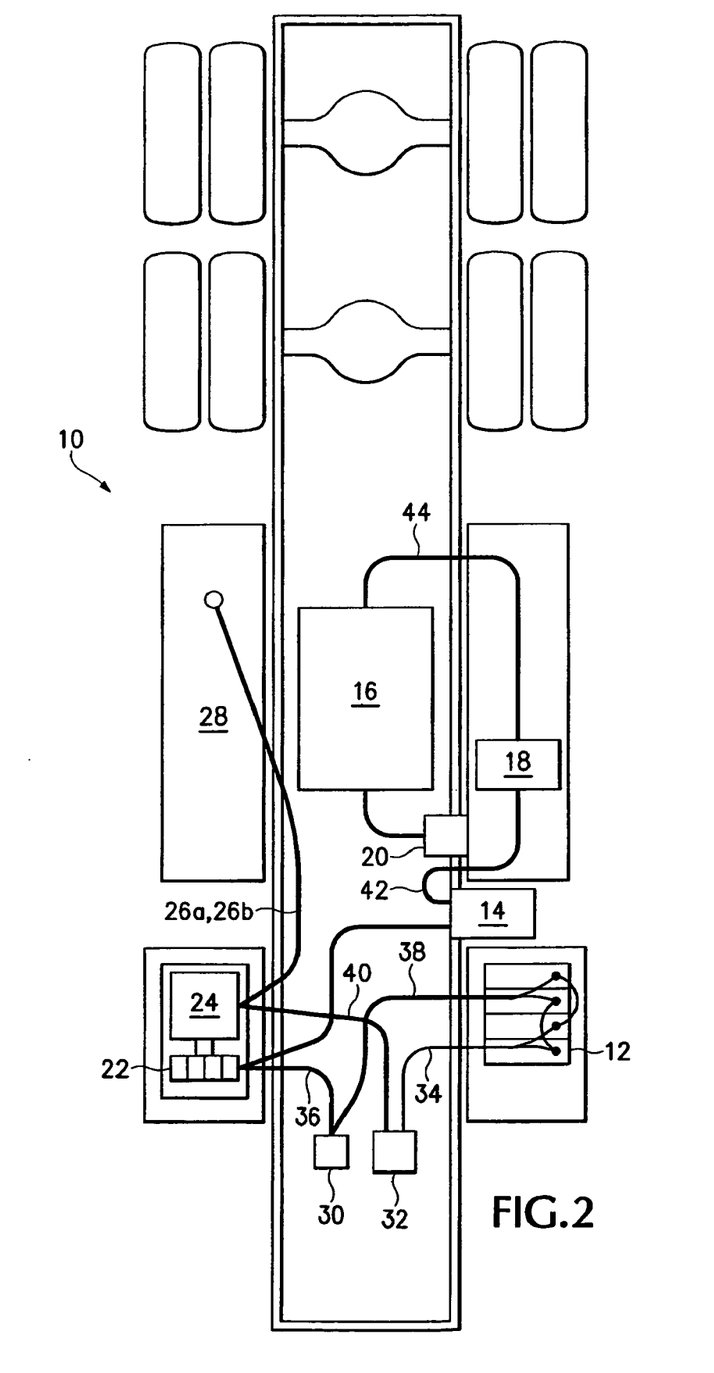
FIG. 2 is a top plan view of the invented apparatus and system in the context of its use in providing auxiliary power to a commercial wheeled vehicle, in accordance with one embodiment of the invention.

FIG. 1 illustrates the invented apparatus 10 by way of a schematic circuit diagram, in accordance with one embodiment of the invention utilizing a lead acid battery and instrument control system (ICS) and referred to herein as an eGen-a-Sys™ system. (eGen-a-Sys™, Gen-a-Sys™ and Gen-a-Sys Q™ are trademarks owned by Enertek Solutions, Inc., the assignee of the present invention, world-wide rights reserved.) FIG. 2 illustrates the invented apparatus 10 in a cutaway top plan view of a sleeper-type commercial truck, showing the chassis and tandem wheel assemblies schematically beneath the invented apparatus and system 10, for the sake of context. FIGS. 1 and 2 are referenced collectively immediately below.

Apparatus 10 is straightforward but unique to the present invention. It includes a bank 12 of lead acid batteries 12a, 12b, 12c, 12d, the bank of batteries being independent from the main battery system powering the vehicle. Batteries 12a, 12b, 12c, and 12d each are nominally 12 volts (direct current—VDC) automotive or marine batteries having a form factor compatible with a trim fit thereof within the left auxiliary equipment bay of, for example, a sleep-over type of commercial truck such as one made by Peterbilt™. Batteries 12a, 12b, 12c, and 12d available from Trojan™ are connected in series and parallel, as illustrated, to produce high-wattage 24 VDC output to what will be referred to herein as an instrument control system (ICS) 14. (Any suitable alternative form factor and/or type of battery, e.g. lead acid, lithium ion, liquid metal hydride, etc. can be used.) ICS 14 inputs 24 VDC input from lead acid battery bank 12 and produces an output of either 110 volts (alternating current—VAC) or 220 VAC to drive an under-cab air conditioner/heater 16 (including conventional compression and/or refrigeration and/or heater components) such as one made by Carrier™ via a shore power breaker box 18. Those of skill in the art will appreciate that air conditioner 16 typically is regulated by a manual thermostat control 20 in the sleeper portion of the commercial truck or other vehicle. A five and one-half kilowatt (5.5 kW) generator 22 provides 400 VAC to ICS 14, as indicated.

ISC 14 in accordance with the invention provides two primary functions: 1) it inverts 24 VDC from bank 12 to 110 VAC/220 VAC, e.g. via high-efficiency switching components of a switching inverter 14a; and 2) it rectifies the 400 VAC output of generator 22 to trickle charge the 24 VDC battery bank 12, e.g. via a rectifier 14b. Those of skill in the art will appreciate that the functions of ISC 14 can be alternatively separated into functional or physical component parts, within the spirit and scope of the invention. Generator 22 is directly (shaft) driven in accordance with one embodiment of the invention by a seventeen horsepower (17 hp) internal combustion engine 24 supplied by gasoline, diesel, bio-diesel or any alternative fuel via one or more feed lines 26a, 26b from the vehicle's main or reserve fuel tank 28. (Those of skill will appreciate that a diesel engine typically must have a return because of the way a diesel injection system operates. Such is designed to return excess unburned fuel in an approximately 10-50% proportion, depending upon the model. Moreover, in winter season or extremely cold environments, returned diesel heats the fuel in the main tank to prevent gelling.) A suitable diesel engine 24 (having an integral electronic starter, in accordance with one embodiment of the invention) is available from Lombardini™, although other internal combustion engines can be suitably substituted, within the spirit and scope of the invention.

Those of skill in the art will appreciate that the invented power conversion apparatus and system thus is a truly "hybrid" design in that it utilizes both a battery pack and an internal combustion engine to deliver pure AC power to vehicular appliances. It does so without drawing energy by way of a generator from the main vehicle drive system, e.g. the vehicle's own internal combustion engine. So it is also truly "outboard" in the sense that it is auxiliary to the main drive system.

ICS 14 and generator 22 having the above-described operating specifications are available from Aura Systems, Inc., although those of skill in the art will appreciate that they can be supplied by any suitable manufacturer and to any desired operating specifications, within the spirit and scope of the invention. (For example, suitable alternative, bidirectional, solid-state generators are available from Sawafuji™.) Those of skill in the art also will appreciate that, within the spirit and scope of the invention, generator 22 and engine 24 can be operatively coupled in any suitable manner, as by use of a clutch, belt or bearing operatively coupled therebetween. In accordance with one embodiment of the invention, the rotor shaft of generator 22 and the drive shaft of engine 24 are directly coupled to one another via a plastic 'slip' ring that delivers maximum torque and efficient mechanical-to-electrical power conversion, while protecting the engine and generator components from induced failure.

A dash-mounted generator on-off control panel 30 permits an operator (driver) of the vehicle to start and stop engine 24 as desired to provide auxiliary power to air conditioner/heater 16 or to other AC appliances (not shown) such as a refrigerator, a television, a computer, etc. A dash-mounted manual-override start/stop switch 32, for service and maintenance purposes, to govern the operation of apparatus 10 also is provided in accordance with one embodiment of the invention. For maintenance and/or trouble-shooting purposes, one or more monitoring or sense cables such as cable 34 are provided, in accordance with one embodiment of the invention, to enable maintenance personnel to monitor the DC level, charging capacity, and general 'health' of battery bank 12. Remaining cables and/or wiring harnesses 36, 38, 40, 42, and 44 route power respectively between generator 22 and control panel 30, between battery bank 12 and control panel 30 between engine 24 and override switch 32, between ICS 14 and breaker box 18, and between air conditioner/heater 16 and breaker box 18.

Those of skill in the art will appreciate that AC voltage drops are minimized in accordance with the invention by the simple expedient of shortening the wire harnesses that carry AC voltage from one component to another. More problematic DC voltage drops are minimized in accordance with the invention by using heavy gauge battery-cable wire, e.g. 00 ("double-ought"). Any suitable wiring harnesses for conducting AC or DC voltages within the invented apparatus and system are contemplated as being within the spirit and scope of the invention.

Figure 3:
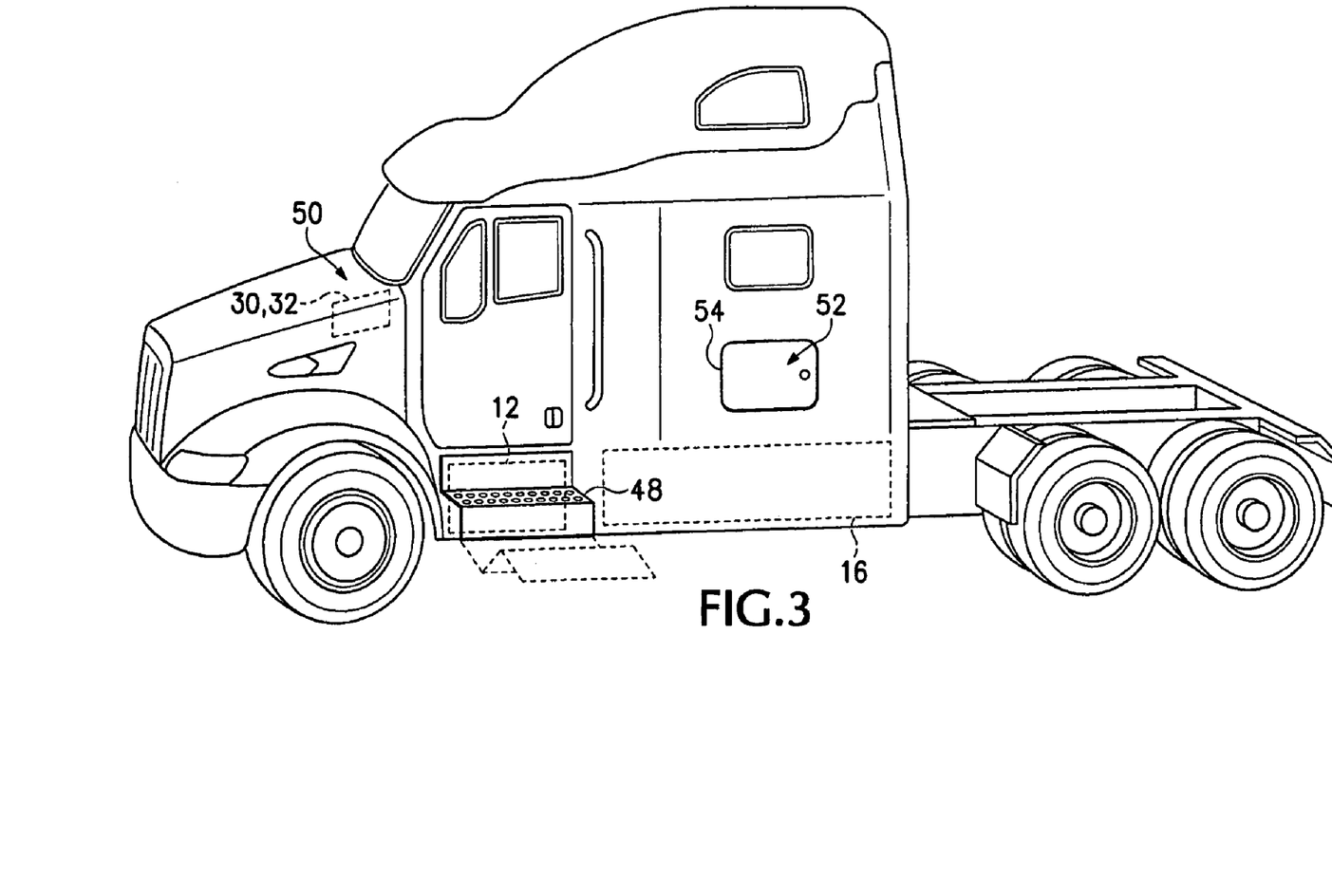
FIG. 3 is a left-side perspective of a commercial truck illustrating incorporation of the invented apparatus and system therein.
Figure 4:
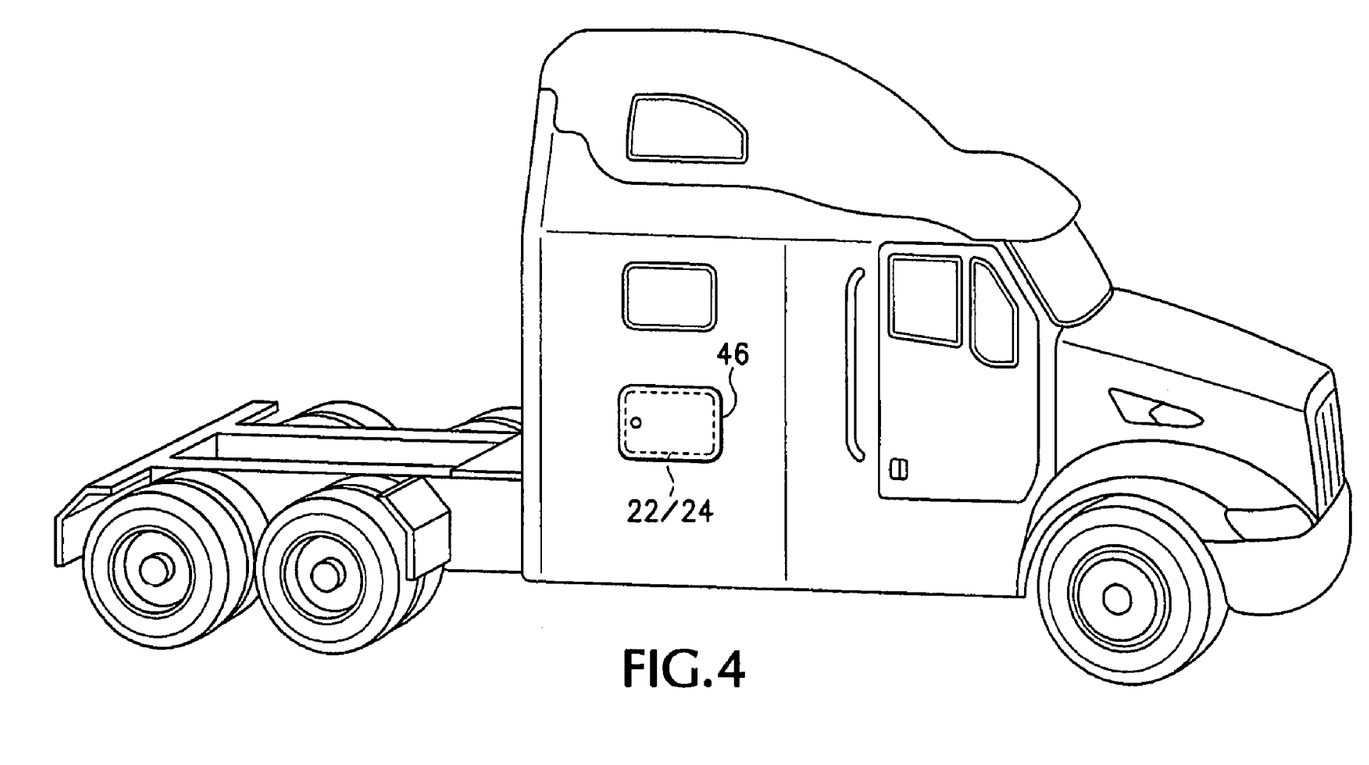
FIG. 4 is a right-side perspective corresponding with FIG. 3.

Referring collectively now to FIGS. 2, 3, and 4, the components of apparatus 10 in accordance with one embodiment of the invention are positioned strategically within the periphery of a stock sleeper truck so as to fit well and trim therein and so as not to interfere with normal operation thereof. For example, generator 22 and engine 24 fit within a smaller right-side auxiliary bay 46 (refer to FIG. 4) of the sleeper truck, bank 12 of batteries fits within a left auxiliary custom bay 48 behind a unique, hinged embodiment of the driver-side steps (refer to FIG. 3 showing the steps in dashed outline when pivoted away from the truck) of the sleeper truck, control panel 30 and switch 32 fit within a dash region 50 thereof, and air conditioner/heater 16 fits under a bed region 52 thereof between the dual parallel frame rails (not shown). Thus, all components are configured, dimensioned, and physically distributed, in accordance with the invention, to have only nominal impact on the normal operation and configuration of the vehicle. For example, the useful carrying and storage capacity of larger left-side cargo/equipment bay 54 (refer briefly to FIG. 3) is not adversely impacted by inclusion of apparatus 10 including air conditioner/heater 16, as is the case with conventional and less-well-designed retrofits.

The high functional density of the invented apparatus and system is evident from the thoughtful selection of the engine, generator, ICS, battery bank and air conditioner/heater components and their placement within and around the vehicle's auxiliary, custom and stock bays. For example, lead acid battery bank 12 fits within a right-rectangular custom bay or space under the driver's side step, the approximately 11 cubic feet ($ft^3$) space being approximately 32.5" in width, 22.5" in depth and 26" in height (with much room to spare, since the lead acid battery bank itself occupies only approximately 4.0 $ft^3$), while generator/engine 22/24 fit within a right-rectangular stock bay or space approximately 32.5" in width, 22.5" in depth and 12" in height. A standard Coleman air conditioner/heater unit is 12" in height, 26" in width, and 34" in length, which dimensions enable it to fit under approximately only one out of three Class 8 trucks.

A Low-Profile Carrier air conditioner/heater unit is of approximately the same dimensions, save for being only approximately 7½ in height. This enables the Low-Profile Carrier air conditioner/heater unit to be mounted under every Class 8 truck manufactured today, facilitating a veritable plug-n-play solution to the form and fit problem. In accordance with one embodiment of the invention, the normal storage capability (again, depending on truck model) which is standard on most trucks is approximately 6-8 $ft^3$. Departing radically from convention whereby the air conditioner/heater unit is placed under the bunk thus utilizing this limited storage space better used for clothes, food, luggage, extra tools, etc. the present invention places a Low-Profile Carrier air conditioner/heater unit under the truck cab, and thereby frees up the room inside the truck cab living space, thereby further increasing functional density. Thus, the four major, space-consuming components in accordance with one embodiment of the invention take up only approximately 15 $ft^3$ of volume, all of which surprisingly small volume is within the periphery of the vehicle but outside the large cargo bay.

In operation, engine 24 drives generator 22 at a nominal eighteen hundred revolutions per minute (1800 rpm) or suitable alternative that is compatible with an efficient tradeoff between fuel combustion and torque. Those of skill will appreciate that efficient operation of engine 24 depends upon its specific design specifications and operating efficiencies. Generator 22 supplies relatively dirty 400 VAC to ICS 14 at a peak current consistent with its power rating, e.g. 5.5 kW. ICS 14 generates from the 24 VDC battery bank 12 relatively clean 110 VAC/220 VAC and supplies the same to air conditioner/heater and other AC appliances (not shown) via breaker box 18. ICS 14 uses efficient, high-frequency switching components to generate a nearly pure sinusoidal 110/220 VAC waveform substantially free of harmonic content. ICS 14 also rectifies and down-regulates the 400 VAC from generator 22 into 24 VDC and supplies the same to battery bank 12 to recharge the batteries when needed.

Thus, battery bank 12 is tapped continuously (while the auxiliary system is on) to generate the AC voltage demands of the auxiliary systems, while battery bank 12 is charged by the engine/generator 24/22 combination only periodically as needed to "top off" the batteries at full charge. This novel circuit topology and component configuration and arrangement makes far more efficient use of fuel from fuel tank 28, since operation of engine 24 and generator 22 is required only occasionally rather than continuously.

Indeed, conventional auxiliary power units (APUs) run continuously during a ten-hour roadside stop and rest period, consuming several gallons of fuel in a ten-hour rest period. In significant contrast, invented apparatus 10 runs only a couple of relatively brief, e.g. one to two-hour, periods of time over a ten-hour rest period, consuming only a couple of pints of fuel, nearly an order of magnitude improvement in efficiency based on run-time alone. Moreover, conventional APUs utilize engines that operate at higher rpm, e.g. typically 3600 rpm, which operation is less fuel efficient than the operation of engine 24 at 1800 rpm as in accordance with the invention. Thus, only approximately ⅓-½ the fuel is consumed in accordance with invented apparatus 10, and what fuel is consumed is consumed more efficiently to drive the high-efficiency generator and ICS. Again, this is due to the use of rectified AC power to charge the battery bank, the output of which is rectified and in turn used to power the auxiliary system, rather than, for example, driving the auxiliary system directly from an AC alternator or generator.

Thus, in accordance with the invention, by use of an engine operating at only approximately ⅓-½ the revolutions per minute and by use of such an engine only approximately ⅓-½ the time, it is possible to achieve up to a 9:1 efficiency advantage over conventional APUs, at great cost savings, great fossil fuel savings, and great reduction in toxic emissions. The invention succeeds by using a battery bank normally to power the auxiliary system, while only occasionally tapping the fuel source to replenish the at-voltage current-delivery capacity of the batteries.

An alternative embodiment of the invention is contemplated in which a Kubota™ diesel engine, a Markon™ generator, and a 3500 W inverter replace inverter 14a, rectifier 14b, generator 22, and engine 24 of FIG. 1. Thus, the Gen-a-Sys™ and Gen-a-Sys Q™ product configurations made in accordance with this alternative embodiment of the invention also represent an efficiency/performance improvement over conventional APUs, because of their similar but not identical circuit topology and componentry. Yet another embodiment envisioned as being within the spirit and scope of the invention not expressly illustrated in FIG. 1 whereby two inverters replace inverter 14a in a bifurcated power distribution mechanism: one characterized by a relatively low-power, low-cost "moderately" clean AC output for air conditioner/heater 16 and another characterized by a relatively high-power (e.g. 5.5 kW), but low-cost (e.g. $500) "purely" clean AC output for other appliances such as televisions or computers that are more sensitive to "dirty" power (containing digitally simulated sinewave "stairstep" harmonics or other artifacts). Such a "Virtual APU" would obviate the need for high-cost (e.g. $30 k) air conditioner/heater units such as Vector unit that puts out only 2 kW of relatively "clean" AC power.

Figure 5:
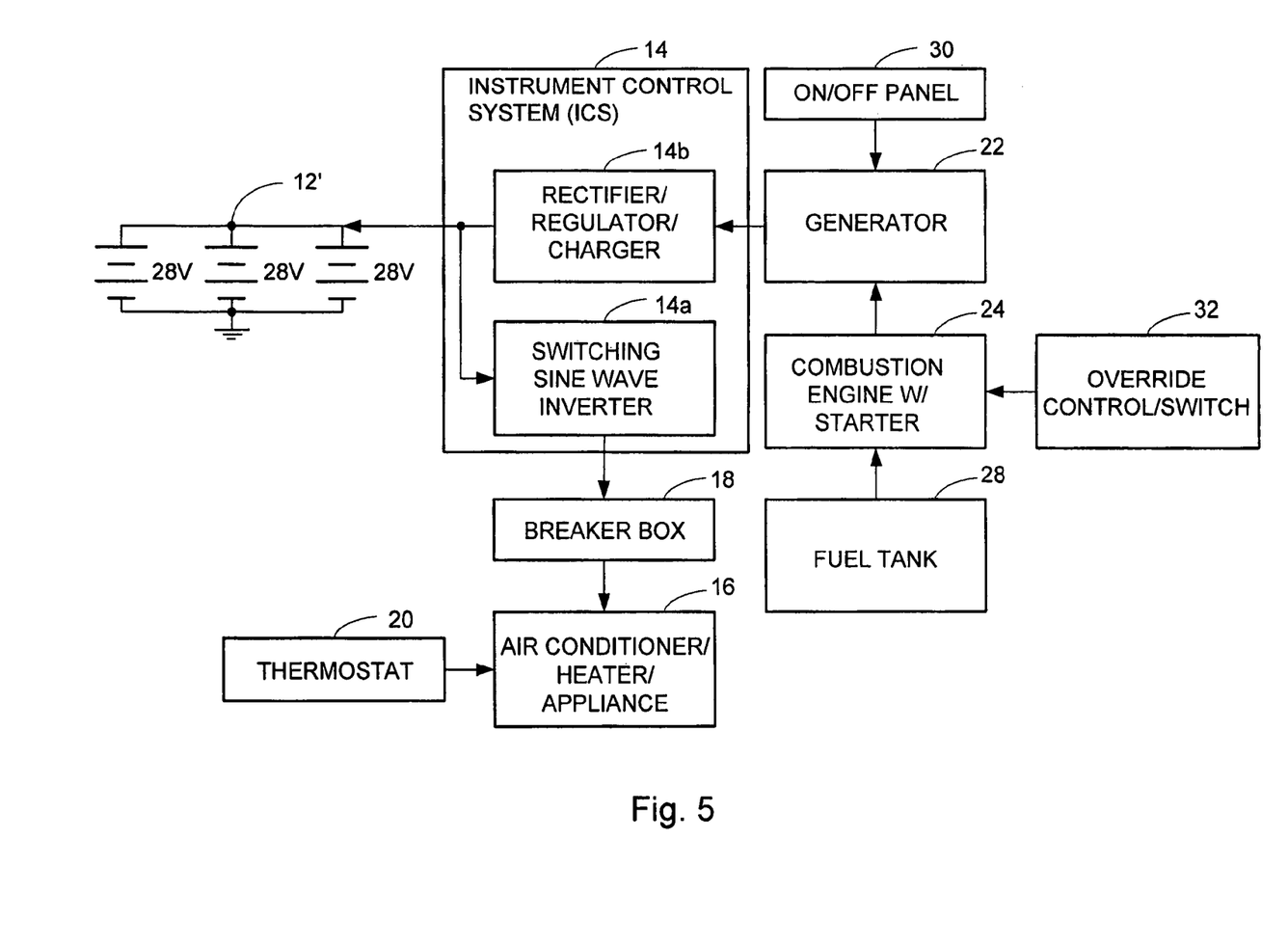
FIG. 5 is an electrical schematic block diagram of the hybrid auxiliary power conversion apparatus, in accordance with another embodiment of the invention that utilizes lithium (Li) ion batteries and a battery management subsystem.

FIG. 5 illustrates invented apparatus 10' in accordance with a second embodiment. It will be appreciated that identical components are represented by identical reference designators, and that similar components are represented by similar reference designators. For example, all components and their configuration within the illustrated circuit diagram are identical with those and that of FIG. 1, but for battery 12'. Battery 12' will be understood to be an approximately 23" high vertically stacked arrangement of three 28 VDC lithium (Li) ion battery banks connected in parallel. Each bank in turn includes in accordance with one embodiment of the invention seven stacked 4 VDC cells connected in series. Each cell in accordance with one embodiment of the invention is an approximately rectangular shape approximately 12.5"×17.5"×0.8" and has elongate positive and negative terminals arranged side by side along a long side of the rectangle for easy parallel or series connection to an adjacent one of such cells (the parallel or series connection being determined by whether identical or opposite polarity terminals are in adjacent (left or right-side) placement within the stacked arrangement of cells and banks. Battery 12' nominally supplies up to three kilowatts (3 kW) of power for six continuous hours, after which battery 12' must be recharged for approximately two hours.

Those of skill in the art will appreciate that Li ion batteries 12' are lighter in weight, smaller in footprint, and smaller in volume than lead acid batteries 12 shown in FIG. 1. Indeed, the volume required to contain Li ion batteries 12' is less than approximately 3 ft$^3$ (as compared to the 4 ft$^3$ volume of battery 12), thus saving substantial space (compared to the space occupied by the lead acid batteries) within the right rectangular custom space behind the driver's side steps.

Li ion batteries 12' are charged with a relatively narrow-hysteresis loop charging cycle, in accordance with the invention. Conventional charging cycles are wider, alternately overtaxing or over-depleting the Li ion batteries, e.g. down to 16 VDC, and then (over)charging them within a short period of time back up to their full nominal rated voltage, e.g. of 28 VDC. The invented charging cycle enforced by ISC 14 instead permits the Li ion batteries to be depleted down to only approximately 21 VDC before more gently charging them over a longer period of time back up to a de-rated voltage slightly below their nominal rated voltage, e.g. back up to only approximately 26 VDC. This novel charging algorithm results in longer lives for the Li ion batteries and less stress and strain on the generator or regulator/rectifier/charger components of ISC 14. Accordingly, the previous experience of burning out generators is avoided.

Figure 6:
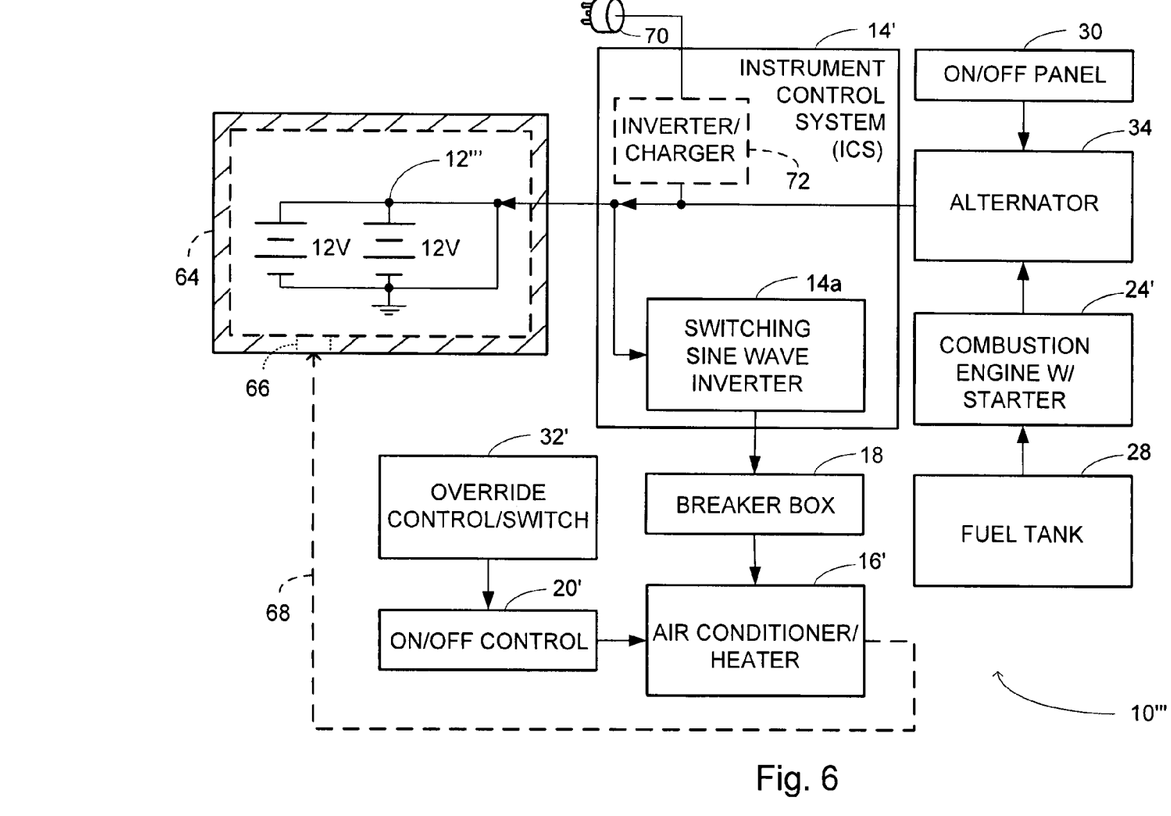
FIG. 6 is an electrical schematic block diagram of a daycab auxiliary power conversion apparatus, in accordance with another embodiment of the invention that utilizes quick-charge nickel metal hydride batteries and an inverter or alternator to drive the daycab's HVAC system.

FIG. 6 is a schematic diagram of the invention in accordance with a third, daycab embodiment. FIG. 6 shows daycab auxiliary power conversion apparatus 10''' including one or more, e.g. two, 12 VDC nickel metal hydride (NiMH) batteries connected in parallel to provide 3 kWh of DC power at a battery pack 12'''. (Li ion prismatic cells, Ni—MH, and LPS64013RC batteries such as those manufactured by Douglas Batteries in Winston Salem, N.C. have been determined suitably to provide the needed form factor and power density for the present invention. Those of skill in the art will appreciate that suitable battery technology alternatives are contemplated as being within the spirit and scope of the invention. Unlike other energy storage devices currently available, the batteries listed above tend to be more environmentally-friendly and clean, thereby reducing diesel particulate emissions into the air.)

An ICS 14' including a 2500 W switching sine wave inverter 14a is configured to invert the 12 VDC power to alternating current (AC). A breaker box 18 may optionally be provided, and an air conditioner/heater 16' with a thermostat or other form of on/off control 20' is provided also (to automatically turn air conditioner/heater 16' off when engine 24' is running and to automatically turn on when engine 24' is off), all in an extremely compact, under-the-passenger-seat package, as will be described below by reference to FIG. 7. A rectifier can also be provided within ISC 14' to rectify AC voltage from an AC power grid, e.g. a charging station, to DC voltage to charge battery pack 12'''.

Optionally, an on/off panel 30 can be provided to control an alternator 34 and the daycab's main internal combustion engine 24' taking fuel from its fuel tank 28, which keeps batteries 12''' fully charged when the daycab's engine is running. (Alternatively, batteries 12''' can be charged from a roadside power grid.) Optionally, an override control/switch 32' can be employed to override on/off control 20'.

In accordance with one embodiment of the invention, the space under the would-be passenger's seat (typically there is no passenger in daycab applications) is approximately 25" wide (side-to-side), 20" deep (front-to-back) and 12" high, and contains air conditioner/heater 16'. Those of skill in the art will appreciate that air conditioner/heater 16' in accordance with the invention has the highest wattage available with the lowest draw in order to make this NiMH battery source as efficient and long-lasting as possible. For example, the air conditioner can be approximately 5000 BTU and the heater can be approximately 900 W. (Such a Coleman-designed and -licensed air-conditioner/heater 16' is available from RV Products of Wichita, Kans., USA. It will be appreciated that alternatively or additionally fuel fire heaters can be used to supply heat to the daycab. Such are available from Espar™ or Webasto™.) Thermal control for NiMH batteries 12''' is provided to permit their full-charge operation and normal discharge-recharge cycling through extreme temperatures from −20° F. to 120° F. Such can be done in accordance with the invention by routing a small portion of condensed cooled air or heated air appropriately in order to maintain a stable, continuous air flow and temperature in the compartment that contains batteries 12'''. Alternatively or additionally, the enclosed space or a box containing the NiMH batteries can be thermally insulated, in accordance with the invention.

Battery pack 12''' is charged from alternator 34 when the daycab's engine 24' is on, and from a roadside power grid when they are plugged in. Thus, a battery charger with both an AC and a DC input are contemplated as being within the spirit and scope of the invention, for the roadside power grid charging operation.

Figure 7:
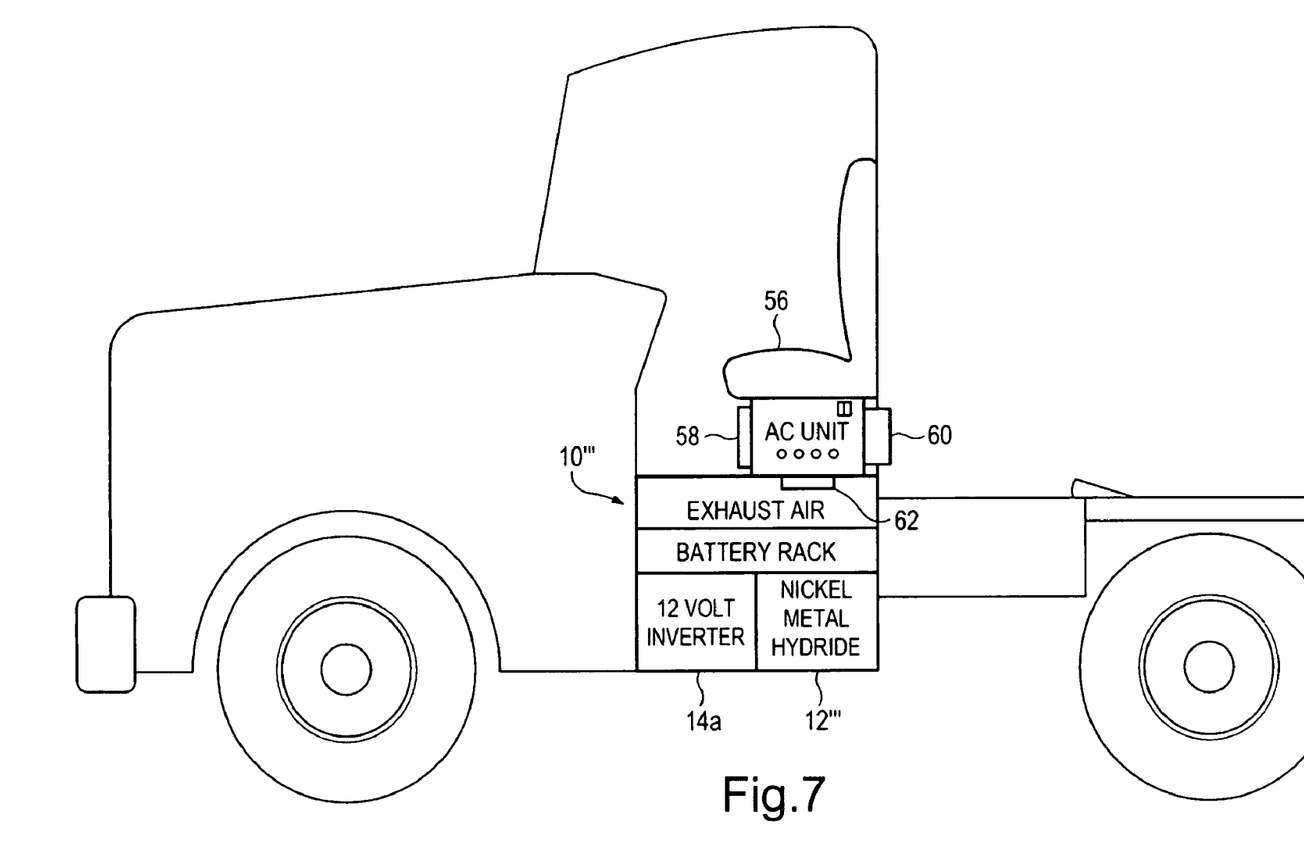
FIG. 7 is a right-side perspective of a commercial truck illustrating incorporation of the invented daycab auxiliary power conversion apparatus therein.

FIG. 7 is a left-side elevation of a commercial, so-called daycab (not drawn exactly to scale), truck illustrating incorporation of the invented daycab auxiliary power conversion apparatus therein. FIG. 7 shows the AC/heater unit under passenger seat 56, with a Tecumseh or other suitable compressor 58 in front of the unit where a passenger's heels would be, with an inlet air port 60 therebehind, and with an exhaust air port 62 therebelow.

(Those of skill in the art will appreciate that, within the spirit and scope of the invention, the inlet and exhaust ports can be differently located. For example, the exhaust air port may be on a vertical tower that extend upwardly from the floor of the daycab between the driver's and passenger's seats, and it may include louvers for directing heat and air conditioning evenly around the daycab. Those of skill also will appreciate that a thermostatic control and temperature monitoring and control touch-screen may be provided for the driver of the daycab to control and monitor the operation of the invented power conversion apparatus and its attached air conditioner/heater unit. Such may be integrated into such an tower to render an elegant and integrated user interface and operator control and airflow console.)

Battery pack 12''' and inverter 14a are located beneath the daycab's standard battery rack, as shown, or alternatively the inverter can be located slightly behind and between the driver's and passenger's seats. As illustrated, air conditioner/heater 16' is approximately 1' high, 18" wide and 20" deep (producing unprecedentedly high functional density within a less than approximately 2.5 ft$^3$ volume), so that it fits easily beneath passenger seat 34, which typically is referred to as a jump-seat.

FIGS. 6 and 7 collectively illustrate other features of invented daycab auxiliary power conversion apparatus 10'''. It may be seen from FIG. 6 that battery pack 12''' can be substantially sealingly enclosed in an enclosure 64 having insulated walls, as suggested by diagonal lines in FIG. 6. An inlet port 66 operatively coupled by a conduit 68 between air conditioner/heater 16' permits suitable heating or cooling convection around battery back 12''' by 'bleeding' or 'siphoning' a suitable fraction of the output of the air conditioner/heater for thermal management thereof under the worst ambient temperature extremes. Those of skill in the art will appreciate that this inventive feature ensures reliable operation of battery pack 12''' at all times and in all weather.

It also can be seen from FIGS. 6 and 7 that a plug-in DC charger port 70 can be provided to ICS 14' with a hard-wired junction for external connection of battery pack 12''' to a road-side power grid or charging station (not shown). Those of skill in the art will appreciate that through what might be thought of as a wire-OR junction, battery pack 12''' can be charged either by alternator 34 when the daycab's engine is idling or by the road-side charging station when the daycab's engine is off. A rectifier/charger 72 is shown in dashed outline between port 70 and battery pack 12''' connection to indicate the need for rectification (conversion from AC to DC power) of AC off an AC power grid, e.g. an AC charging station. It will be appreciated that the AC power grid can also be used to operate AC appliances and subsystems within the daycab, as is known. Finally, it will be appreciated that the rectifier and inverter functions can be combined into a single inverter/charger unit that is similar to switching sine wave inverter 14a but that also provides rectification.

Those of skill in the art will appreciate that, within the spirit and scope of the invention, the only operable connection between invented apparatus 10''' and the daycab's main drive system is this (selective) operable couple between battery pack 12''' and alternator 34.

Apparati 10, 10', and 10''' are referred to herein as being hybrid system topologies, since each features both a battery system and an internal combustion engine that runs on fuel, e.g. gasoline, diesel, bio-diesel or the like. Thus the invention may be thought of as involving hybrid auxiliary power units (APUs) for high-power, low-volume, lightweight, extended-use applications such as supplying auxiliary power to AC electronic devices and accessories in marine, recreational, commercial, air and/or military crafts or vehicles. They are auxiliary, as defined herein, because they advantageously do so substantially without tapping the vehicles' main battery power reserve and, in general, without requiring the vehicles' main drive train to be operating.

Other suitable alternatives are contemplated as being within the spirit and scope of the invention. It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

From the foregoing, those of skill in the art will appreciate that several advantages of the present invention include the following.

The present invention provides greatly improved efficiency in providing AC power to auxiliary systems such as air conditioners/heater and or appliances such as refrigerators, televisions, computers, etc. It uses a surprising order of magnitude less fuel than conventional APUs, thus saving scarce natural resources, by barely 'sipping' fuel while providing DC charging power to a bank of durable batteries that, in turn, supply robust power to a high-efficiency switching inverter capable of supplying clean AC power to the auxiliary system. The invention takes the form of a compact, distributed-component system that maximizes the utility of the available space in a conventional sleeper-styled commercial truck. The relatively small footprint and volume, as well as the location, of the components beneath the bed and within the perimeter of the truck leave most cargo space empty and thus useful for its intended long-haul purpose. Moreover, the compact arrangement within the vehicle's periphery leaves the exterior of the vehicle free from external mounting hardware, hangers, supports, platforms, carriers, etc. The use of less fuel and the more efficient burning of smaller volumes of fuel solves two major problems at once: they conserve limited fossil fuel resources and they reduce toxic emissions and thus preserve the environment.

Those of skill in the art will appreciate that use of the invented apparatus and system is contemplated with any vehicle or marine craft, whether regulation requires a 'rest' period during which auxiliary systems need efficient outboard power. This is because the invention lends itself to highly efficient use of diesel or other fuel to supply AC power to any appliance, without requiring the vehicle or craft's main engine to be operating. Thus, incorporation of the invented system and apparatus or its equivalent within any vehicle or craft (e.g. commercial truck, RV, bus, marine, military or air craft, etc.) is deemed within the spirit and scope of the invention.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. Auxiliary power conversion apparatus for use in a daycab comprising:
    an auxiliary battery pack;
    a switching inverter operatively coupled with the auxiliary battery pack to convert direct current (DC) power to alternating current (AC) power; and
    an AC heating and air conditioning unit operatively coupled with the inverter, wherein the unit is configured to mount within a daycab underneath and substantially within the lateral confines of the daycab's passenger seat, wherein the battery pack is configured to be operatively coupled with a daycab's alternator for charging the battery pack when the daycab's engine is running, and wherein the only operable connection between the apparatus and the daycab's main drive system is the operative coupling configuration between the battery pack and the daycab's alternator.

2. The apparatus of claim 1, wherein the unit is configured to occupy a volume within a daycab of less than or equal to approximately 2.5 cubic feet.

3. The apparatus of claim 1, wherein the auxiliary battery and the inverter are configured to mount within a daycab underneath and substantially within the lateral confines of the daycab's main battery rack.

4. The apparatus of claim 3, wherein the unit and compressor are configured to occupy a volume within the daycab of less than or equal to approximately 2.5 cubic feet.

5. The apparatus of claim 3 further comprising:
    an inlet air port operatively coupled with the unit and mounted therebehind; and
    an exhaust air port operatively coupled with the unit and mounted therebeneath.

6. The apparatus of claim 5 further comprising:
    an external connector port for operatively coupling the battery pack with an external grid power source to charge the battery pack.

7. The apparatus of claim 6, wherein the battery pack is contained within a substantially sealed and insulated enclosure.

8. The apparatus of claim 7, wherein the enclosure is in convectional communication with an output port of the unit, thereby to insulate the battery from an ambient environment and to heat or cool the battery pack.

9. The apparatus of claim 6, wherein the battery is in convectional communication with an output port of the unit, thereby to heat or cool the battery pack.

10. The apparatus of claim 1 further comprising:
    a compressor operatively coupled with the unit and configured to mount within the daycab immediately adjacent the unit.

11. The apparatus of claim 1, wherein the battery pack includes one or more batteries.

12. The apparatus of claim 11, wherein the one or more batteries include two or more batteries connected in parallel.

13. The apparatus of claim 12, wherein the two or more batteries are of a nickel metal hydride type.

14. The apparatus of claim 12, wherein the two or more batteries are of a lithium ion type.

* * * * *